June 13, 1967 P. A. W. JURSCHEWITZ 3,325,386
POLYMERIZATION PROCESS USING ULTRASONIC VIBRATIONS
Filed Dec. 18, 1963 7 Sheets-Sheet 1

United States Patent Office 3,325,386
Patented June 13, 1967

3,325,386
POLYMERIZATION PROCESS USING ULTRASONIC VIBRATIONS
Paul Arthur Woldemar Jurschewitz, 4 Rue Chalgrin, Paris, France
Filed Dec. 18, 1963, Ser. No. 331,583
4 Claims. (Cl. 204—159.22)

ABSTRACT OF THE DISCLOSURE

A polymerization process for the preparation of solid polymers by letting their constituents fall freely through a column of inert gas vibrating at supersonic frequency, said frequency related to the resonance frequency of an olefinic double bond by a subharmonic of said resonance frequency.

---

The present invention relates to a polymerization process for any polymerizable body such as plastic materials in which, after an adequate mixing of the constituent materials, the mixture of the starting materials is made to pass in a continuous manner into a vibration zone, the vibrations being of such force that the molecules of each constituent are polymerized with the other constituents so as to form practically totally polymerized macro-molecules, and the thus polymerized product is made to pass into a cooling zone whose purpose is to shrink and completely solidify the product. Thereafter, this product could be crushed, dried and stored. The advantage of this process is that it is possible to effect within a very short period of time and at a very low cost a roughly total polymerization of the constituents of the products to be obtained.

According to another feature of the invention, the vibrations are generated by electronic means, for example by piezo-electricity.

The intimate mixture of the materials is advantageously made to pass into the zone of vibrations in the form of small streams vertically and continuously descending through this zone.

It could be advantageous to maintain the zone of vibrations at a temperature higher than the surrounding temperature, for example between +20° C. and 220° C., the maximum temperature being often determined by the heat resistance of the vibration-producing apparatus.

The temperature of the cooling zone can vary between —10° C. and —60° C.

According to another feature of the invention, the product issuing from the vibration zone is made to pass through a purification or refining zone, in which the major part of the occluded gases are removed from the product by application of heat, before being conducted to the cooling zone.

Another feature of the invention is the provision of a polymerization plant comprising, in succession, containers for the starting materials, mixing means for intimately uniting all the constituents of the materials to be polymerized, at least one vibration element subjecting the merely mixed constituents to a substantially complete polymerization, and at least one cooling element for shrinking and solidifying the polymerized material. The plant could further comprise crushing, drying and storing means, so that it is possible to unite in a single plant in a successive and continuous manner all the means for obtaining a substantially totally polymerized product.

According to another feature of the invention, the plant preferably comprises a refining chamber including heating means, said chamber being inserted in the path of the polymerized product between the vibration zone and the cooling chamber.

According to one embodiment, the vibration element comprises a tubular portion which forms the enclosure of the vibration chamber and is provided with an annular chamber which is located in the walls of the element and extends over almost the entire height of said element. This chamber is fed in a closed circuit with a gas such as helium or any other gas performing the same function and having the same properties.

According to another embodiment, the vibration element comprises a tubular sleeve defining a vibration zone and an electronic device connected to the latter in such manner as to create vibrations within this zone.

The invention also embraces the polymerized materials obtained by the process according to the invention.

Further features and advantages of the invention will be apparent from the ensuing description, given with reference to the accompanying drawing to which the invention is in no way limited.

Figure 1:
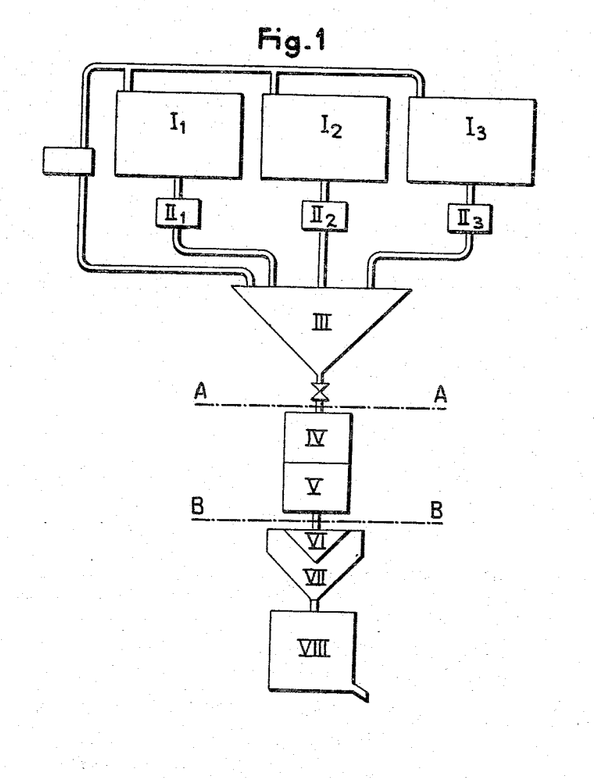
FIG. 1 is a diagram illustrating the order of the various operations of the polymerization process.

The process of the invention is carried out in the following manner (see FIG. 1):

The constituents of the plastic material to be polymerized are stored in containers $I_1$, $I_2$ and $I_3$, the number of these containers varying with the number of constituents. The various constituents of the plastic material pass from the containers $I_1$, $I_2$, $I_3$ through metering means $II_1$, $II_2$, $II_3$ and are conducted to a mixing vessel III.

The various constituents are very intimately mixed in this mixing vessel III and are thereafter conducted into a reaction column which is composed of a vibration chamber IV and a low-pressure chamber V.

The substantially total polymerization of the constituents of the plastic materials previously mixed in the vessel III occurs in this vibration chamber IV. The special features of this vibration chamber will be explained hereinafter.

After having been polymerized, the plastic material must pass through the low-temperature chamber V. The passage through this low-temperature zone causes the shrinkage of the plastic material and a solidification of the latter.

After having left the low-temperature chamber V the polymerized plastic material is finely comminute in a crusher VI and temporarily stored in a container VII.

The finely crushed plastic material is then dried in a chamber VIII before being finally stored.

The process of the present invention has considerable advantages in that it provides within an extremely short period of time a substantially total polymerization of the plastic material which improves its qualities and makes it possible to employ plastics in fields in which they have not been employed up to the present time.

The first embodiment of the plant according to the present invention illustrated in FIGS. 2 to 5 is constructed in the following manner.

Figure 2:
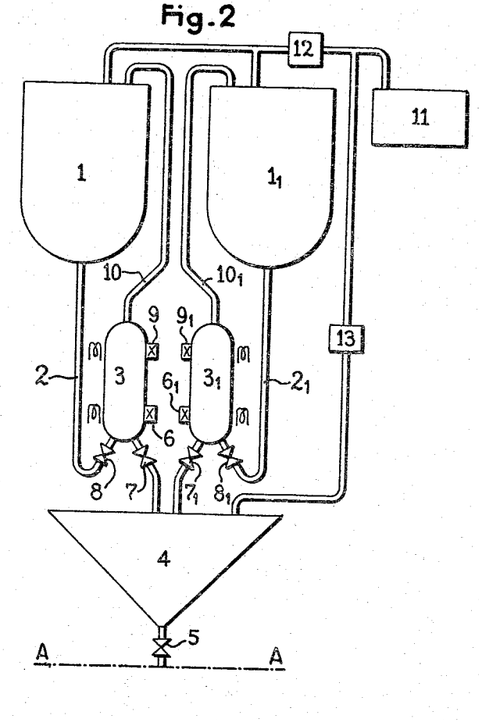
FIG. 2 is a diagram of the first stage of the polymerization plant in which the mixture of the constituents of the plastic material is carried out in accordance with a first embodiment of said plant.

The constituents of the plastic material to be produced are stored in the containers 1 and $1_1$, the number of containers varying with the number of constituents necessary for each plastic material it is desired to obtain. These containers communicate by way of pipes 2, $2_1$ with metering means 3, $3_1$, respectively, which regulate in a predetermined manner the amount of each constituent sent to the mixer 4.

The metering means are also connected to the containers 1, $1_1$ by pipes 10, $10_1$, each container 1, $1_1$ being, moreover, provided with a contact pressure gauge which, when the amount of product remaining to be utilized becomes small, actuates an alarm and starts up a time-delay device (not shown) which, at the end of a given period of time and if the container has not been filled in the meantime, closes the feed valves of the reaction column and, if need be, cuts off the supply of electric energy to the whole of the plant.

For example, each metering means can be provided internally with a floating metal ballonet or float (not shown) and externally with two photoelectric cells 6, 9 and $6_1$, $9_1$ respectively whose function will be explained hereinafter.

When the volume occupied in the mixer 4 reaches a given value, a pressure gauge (not shown) located on the lower part of this mixer and terminating in an electrically controlled valve 5 closes a switch which, through the medium of a relay, simultaneously opens all the plant supply valves and connects the photoelectric cells in the circuit. The liquids then flow through the pipes 10, $10_1$ and causes the ballonets to descend. When the latter intercepts the light beams of the cells 6, $6_1$ closing the switches which close, through the medium of a relay, the nitrogen valve, a second switch cuts the cells 6, $6_1$ out of circuit and corrects the cells 9, $9_1$ in circuit, this second switch having the feature of being shunted and inserted in a special circuit. When one of these switches is the first to close, it starts up a time-delay device (not shown) which stops if all the second switches are closed before a given period of time, or alternatively actuates an alarm device some time after the closure of the valve 5 which supplies the reaction column.

In normal operation, the time-delay device stops and opens the valves 8, $8_1$ and each ballonet then rises and intercepts the light beams of the cells 9, $9_1$. At this moment each cell 9, $9_1$ closes the switch which closes, through the medium of a relay, the corresponding valves 8, $8_1$, whereupon a second switch cuts the cells 9, $9_1$ out of circuit and reconnects the cells 6, $6_1$ in circuit. The containers 1, $1_1$ and the mixer 4 are supplied with nitrogen from a tank 11, the nitrogen being conducted to the containers 1 and $1_1$ by way of a compressor 12, and to the mixer 4 by way of a compressor 13.

The intimate mixing of the constituents is carried out in the mixer 4. For this purpose, a shaft provided with blades rotating on the axis of this mixer and in the opposite direction of a helical screw projecting from the inner face of the mixer can be employed.

The mixer is closed in its upper part and the only entrances provided are for the constituents and the nitrogen admitted for expelling the air in the container. The mixer terminates in an electrically controlled valve 5 (FIGS. 2 and 3), this valve constituting the inlet of the reaction column which will be described hereinafter.

Figure 3:
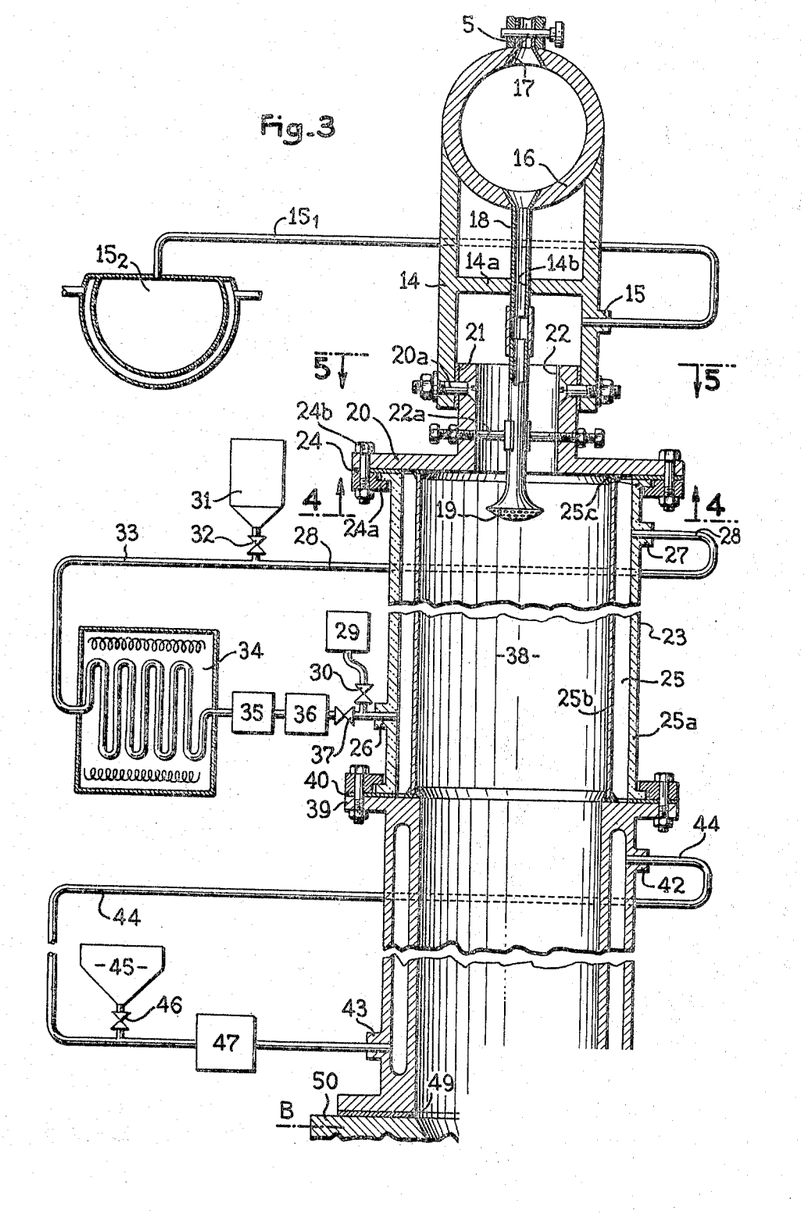
FIG. 3 is a sectional view of the second stage of the plant, i.e. the polymerization apparatus proper, in accordance with the first embodiment.

Generally speaking, the reaction column comprises a steel sleeve 14 provided with a gas outlet 15. Fixed in the upper part of this sleeve is a spherical element 16. The latter has at its top an opening 17 for receiving the liquids from the mixer 4 and a tube 18 connected to its bottom part conducts, through the medium of a distributing head 19, the products into the reaction column proper. The sleeve 14 is secured at its lower end to a steel cover 20 through the medium of a sealing element 21 (composed for example of cork, asbestos or fibers), this cover having at its center an opening 22 the purpose of which will be explained hereinafter. The tube 18 is maintained in the center of the sleeve 14 by, on the one hand, a disc-shaped portion 14a of the sleeve having a central aperture 14b through which the tube extends, and, on the other hand, a fixing arm 22a which is rigid with the cover and extends across the opening 22.

The cover 20 rests on a tubular element 23 through the medium of a sealing element 24, the latter being resistant to the temperatures and vibrations to which it is intended to be subjected. A fixed ring 24a rigidly connects the element 23 to the cover 20 through the medium of bolts and nuts 24b, the cover 20 being also rigidly connected to the sleeve 14 by screws 20a. The element 23 is preferably circular in cross-section but could have any other shape, such as a polygonal profile, which satisfies the requirements of the necessary vibrations.

In any case, the element 23 comprises an annular chamber 25 which is of circular cross-section and extends over almost the entire height of the element 23 and comprises in diametrically opposed axially offset relationship two apertures 26 and 27, the lower aperture 26 constituting an inlet port and the aperture 27 being an outlet port.

Figure 4:
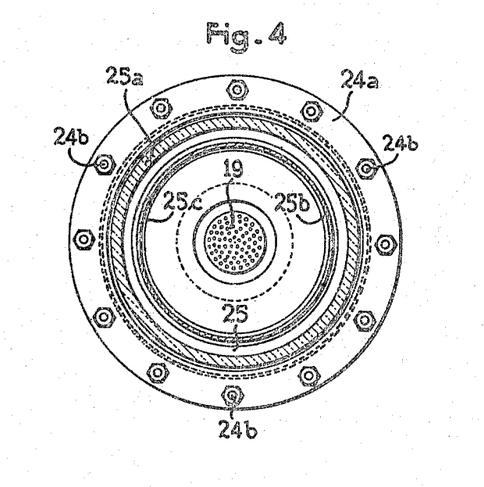
FIGS. 4 and 5 are sectional views, on an enlarged scale, of details of the apparatus shown in FIG. 3, these views being taken along lines 4—4 and 5—5 of FIG. 3.

The annular chamber 25 is defined externally by a thick cylindrical wall 25a and internally by a cylindrical wall 25b which is thin enough to transmit the vibrations. This wall is held in position at both ends by a sealing element 25c which resists the vibrations. The wall 25b defines the vibration chamber of the plant in which the products are subjected to the vibrations. In a laboratory test model, described by way of example, the vibration chamber had a diameter of 64 mm., the wall 25b was composed of 3 mm. thick Pyrex glass and wall 25a was of 5 mm. thick Pyrex glass.

The annular chamber 25 with its two ports 26 and 27 is part of a closed fluid circuit. This circuit can be put under vacuum by a suction pump 29 which can be separated from the closed circuit by a valve 30. If a vacuum is created in this closed circuit a gas, such as helium or its equivalent, is allowed to enter this circuit from a tank 31 through a valve 32. This gas is conducted by a conduit 33 into a heating apparatus 34 where it is heated before being compressed in a compressor 35.

Upon leaving the compressor 35, the gas is sent into a siren 36 which sends the compressed gas with high vibratory pulses through a valve 37 into the annular chamber 25.

The outflow of gases from the siren 36 is so intense that the inner wall 25b of the element 23 is subjected to ultrasonic vibrations which vibrate the atmosphere contained in the vibration chamber 38. After having been injected into the chamber 25, the gas issues from the latter by way of the port 27 and then returns in the closed circuit to the heating apparatus 34 and the compressor 35, any possible losses being compensated by an additional supply of gases from the tank 31.

Figure 5:
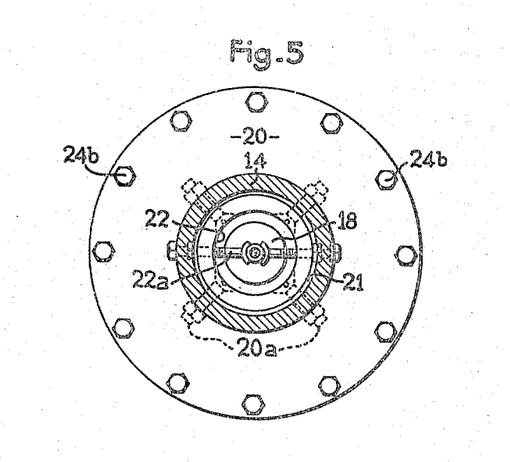

The element 23 is rigidly connected with a cylinder element 39 through the medium of a sealing element 40 having the same properties as the element 24. This element 39 also has an annular chamber 41 provided with two diametrically opposed and axially spaced apertures 42 and 43. The annular chamber 41 is part of a closed circuit 44 which is supplied with nitrogen by a tank 45 through a valve 46. The nitrogen is put under pressure in a compressor 47 and sent into the chamber 41 so as to cool the chamber 48 defined by the element 39. The whole of the reaction column rests, through the medium of a sealing element 49, on an apparatus 50 whose operation will be described hereinafter, the sealing element 49 being crush resistant and withstanding the prevailing temperature.

The apparatus 50 (FIG. 6) comprises two parts, namely a crusher 51 and a storage space 52. Should the level in this storage space 52 reach the photoelectric cells 53, the light beam between the two cells is intercepted and this opens a trap 54 which allows the powder contained in the space 52 to drop into a drying column constituted by a tube 55. This drying column 55 comprises on its outer walls heating means such as infra-red ray lamps disposed at 90° to each other.

Figure 6:
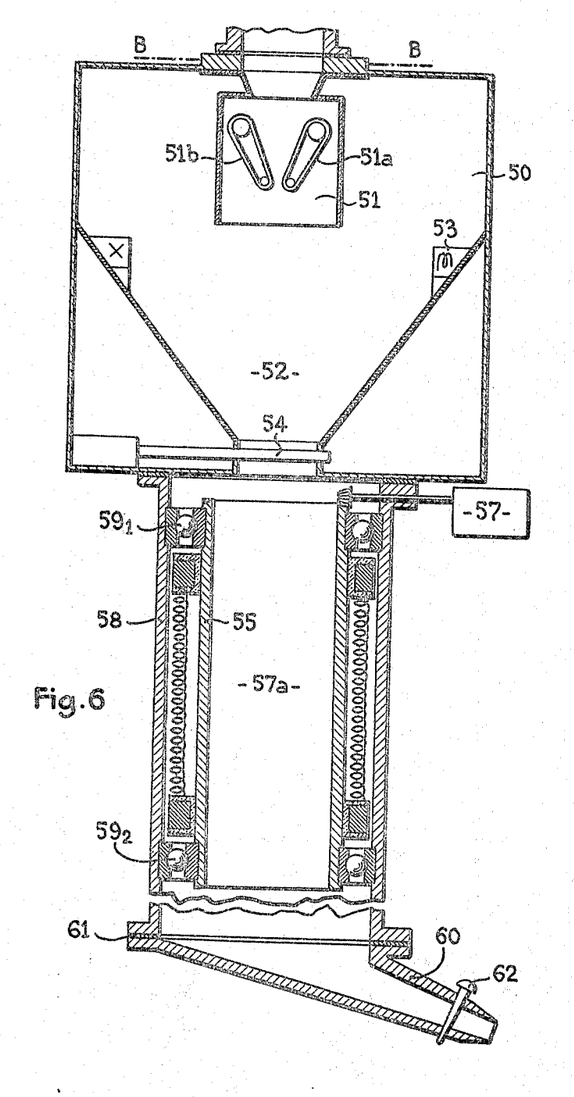
FIG. 6 is a sectional view of a third stage in which the polymerized product is crushed, dried and stored.

The tube 55 is rotated by driving means 57 so that this tube also rotates the heating means which insures an even radiation of heat in the space 57a within the drying column.

The drying column is rotatably mounted within a housing 58 by means of ball bearings $59_1$, and $59_2$. The housing 58 terminates at its lower end in a filling spout 60 rigid with the housing 58 through the medium of a sealing element 61.

It should be understood that the invention embraces any other mechanical or other suitable means for evenly drying the particles of crushed plastic material in a descending powder mass.

In the embodiment shown in FIGS. 1 to 6, the polymerization process is carried out in the following manner:

After having been intimately mixed in the mixer 4, the polymerizable constituents are admitted into the element 16 by way of the electrically-controlled valve 5.

Upon leaving the element 16, the mixture of the constituents is guided by the tube 18 down to the distributing head 19. Here the mixture is emitted in such manner that it descends vertically in the reaction column in the form of a multitude of thin streams.

In issuing from the head 19 the mixture is subjected directly to the ultrasonic vibrations, these vibrations having such force that the molecules of each constituent energetically burst and are reticulated and polymerized with the other constituents.

This polymerization process necessarily gives off a gas, such as hydrogen cyanide, depending on the nature of the constituents. As this gas is lighter than the atmosphere of the chamber 38, it very rapidly rises through the opening 22 of the cover 20 and is exhausted through the opening 15. The gas is conducted into a container $15_2$ from this opening 15 through a conduit $15_1$. This container $15_2$ advantageously has a double bottom so as to permit immersing it in nitrogen and thus highly cooling it. This cooling slightly crystallizes the gas and consequently renders it harmless, in particular for the personnel operating the polymerization plant. If the container $15_2$ is filled, it is sufficient to empty it for employing the recovered gases for example in other industrial processes.

After having been subjected to the vibrations, the mixture of the constituents of the plastic material is substantially totally polymerized. The thus polymerized particles descend vertically down the reaction column and enter the cooling zone constituted by the element 39. The cooling is effected under the effect of the nitrogen circulating in the annular chamber 41. If the temperature for polymerization is of the order of +60° C. to 220° C. in the vibration chamber, the temperature of the cooling chamber would be of the order of −10° C. to −60° C., which is equivalent to a very sudden and great temperature change. This sudden temperature change agglomerates the various polymerized particles and solidifies the polymerized product which assumes in this cooling chamber the form of a thin column.

In descending in a continuous manner, the polymerized product falls into the crusher 51 which comminutes the product and reduces it to a powdered state before final drying. For this purpose, it is preferable to employ a crusher of the type comprising two bolts 51a, 51b composed of stainless-steel wires rotating at high speeds in opposite directions, the spacing between these two belts being varied in accordance with the type of product to be crushed. It must be understood that this crusher has been mentioned merely by way of example since it is possible to employ any other crushing means performing the same function. After crushing, the product in its powdered state is temporarily retained in the space 52 before final drying in the drying column 55.

Here again, FIG. 6 illustrates a drying means only by way of example, and, depending on the needs and in particular the size of the apparatus, other drying means could be employed which insure an easy and constant drying of the polymerized particles passing through the drying column. A valve 62 permits finally regulating the flow of the product which is stored in a continuous manner in the form of a powder.

FIGS. 7–10 illustrate another embodiment of the polymerization plant according to the invention. It comprises an upper container 101 to which the liquid or gaseous monomeric constituents to be polymerized are supplied by storage tanks (not shown) after they have been metered or dosed in accordance with the nature of the properties of the polymer or copolymer to be obtained. If necessary, the plasticizers solvents, fillers, dyes, etc. suitable for the contemplated manufacture can also be introduced into this container. A polymerization catalyst is preferably also introduced into the mixture so as to facilitate the subsequent polymerization in the vibration zone of the plant. This container 101 comprises any suitable devices, such as bladed stirrers (not shown), for intimately mixing all the constituents.

Figure 7:
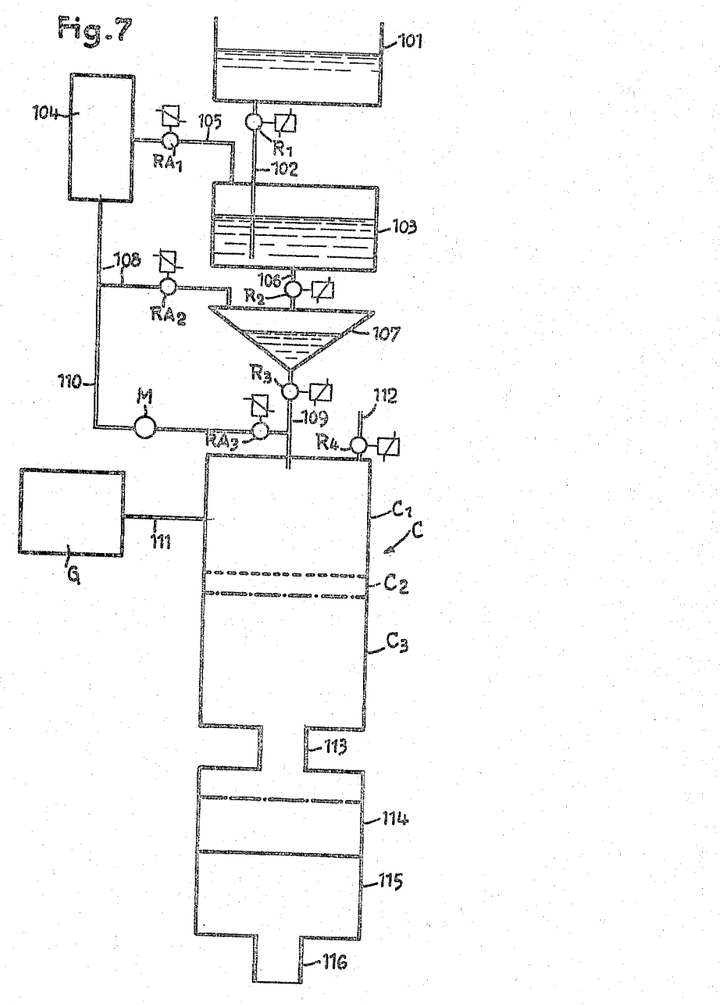
FIG. 7 is a very simplified diagram of the whole of the plant according to a second embodiment of the invention.

A pipe 102 comprising an electrically operated valve $R_1$ conducts the mixture into a closed container 103 in which it is stored under an inert atmosphere, such as for example nitrogen supplied by a separate tank 104 for this gas which is connected to the container 103 by a pipe 105 including an electrically operated valve $RA_1$. A mixer (not shown) is also disposed in this container 103. A pipe 106 provided with an electrically operated valve $R_2$ conducts the liquid leaving the container 103 into a closed funnel-shaped container 107 in which the mixture is maintained under an atmosphere of an inert gas by a pipe 108 leading from the tank 104 and including an electrically operated valve $RA_2$. This container 107 can also include a mixing device and a heating device such as an electric resistance encompassing its wall, for example, so as to raise, if desired, the temperature of the mixture to be polymerized to a given value. It is also advantageous to place a thermistor in this vessel for controlling the temperature of the mixture and, if desired, the operation of the heating device.

A pipe 109 conducts the mixture from the container 107 to a reaction column generally indicated by the reference character C. Disposed in this pipe 109 is an electrically operated valve $R_3$ and, between the latter and the column C, a pipe 110 including an electrically operated valve $RA_3$ and a pressure-gauge switch M is branched so as to connect the pipe 109 to the pipe 108 leading from the tank 104 containing the inert gas (for example nitrogen).

The reaction column C comprises: a vibration chamber $C_1$, a refining or purifying chamber $C_2$ and a cooling chamber $C_3$ which will be described in detail hereinafter with reference to FIG. 8. The reaction chamber $C_1$ is connected by an electric line 111 to an ultrasound generator G and comprises at its upper part a gas-evacuating conduit 112 provided with an electrically operated valve $R_4$. Another evacuating pipe (not shown) connects the upper part of the refining chamber $C_2$ to the pipe 112 before the valve $R_4$, as will be explained hereinafter with reference to FIG. 8.

A conduit 113 connects the cooling chamber $C_3$ to the following crushing and drying devices which are diagrammatically represented at 114 and 115 and will not be described here. The polymerized product leaves the plant by way of an outlet pipe 116.

Figures 8, 9:
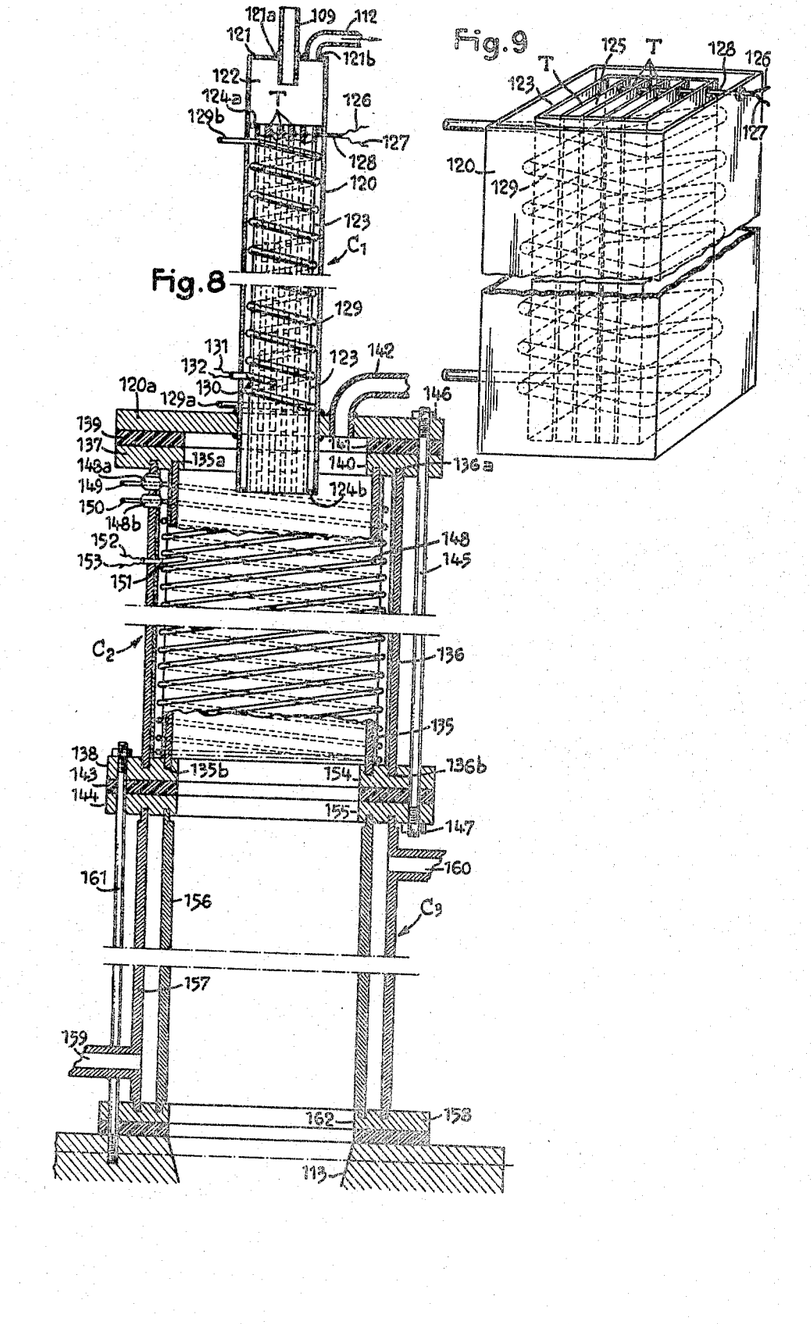
FIG. 8 is a vertical sectional view of a reaction column comprising the vibration chamber, the refining chamber and the cooling chamber of the plant according to still another embodiment of the invention.
FIG. 9 is a perspective view of a part of the vibration chamber showing the vibration-producing elements.

FIG. 8 shows a vertical sectional view of the reaction column C shown in FIG. 7 which comprises three superimposed and intercommunicating chambers $C_1$, $C_2$ and $C_3$.

The vibration chamber $C_1$ comprises, in the presently described embodiment, a vertical elongated outer casing 120 which has a square cross-sectional shape and is for example composed of sheet steel terminating at its upper end in a solid portion 121 constituting a cover. The portion 121 can be an integral part of the casing or formed by a plate welded or bolted to the walls of the casing. Provided in the plane top 121 are two apertures 121a and 121b in which are inserted and secured in a fluidtight manner, for example by welding, the end of the pipe 109 leading from the container 107 (FIG. 7) and the end of the gas-evacuating pipe 112, respectively, the pipe 109 being located on the longitudinal axis of the casing 120. Welded at a distance above the bottom end of this casing is an annular plate 120a which serves to connect the chamber $C_1$ to the refining chamber $C_2$, as will be explained hereinafter. Fixed to the interior of the casing 120, and in coaxial relation thereto, is an elongated parallelepipedic tubular element 123 formed by a square-sectioned sleeve, for example of sheet steel, which extends from the lower end of the casing 120 up to within a certain distance from the ends of the pipes 109 and 112 so as to leave a free space 122 at the top of the chamber. Welded annular flanges 124a and 124b connect the sleeve 123 to the wall of the casing 120 at both ends of this sleeve. This sleeve 123 defines the vibration zone in which the product to be polymerized is subjected to ultrasonic vibrations. The vibrations are generated within this zone by means of transducers T (FIG. 9) which longitudinally extend inside the sleeve 123 at a distance from one another in the transverse direction of the sleeve. The transducers T are each formed by a number of plates 125 of piezoelectric ceramic material, for example of barium titanate or lead titanates and zirconates, which are cemented together or their edges by means of the product known under the trade name of "Araldite" polymerized at high temperature. The number of plates 125 for each transducer T depends on the length of the contemplated vibration zone. This length varies with the nature of the products to be polymerized; it is for example about 1 meter and the sleeve can have for example a side 5 cm. long. The number of transducers is calculated in accordance with the dimensions of the cross-section of the sleeve. In the illustrated embodiment four transducers are provided having a thickness of 0.8–1 mm. which are spaced apart from one another by about 1 cm. The transducers T are held in position in the sleeve 123 by appropriate means, such as tabs welded to the walls. They are electrically connected to a high-frequency generator of any suitable conventional type, such as the generator G shown in FIG. 7, by conductors 126 and 127 which extend through the casing 120 and the sleeve 123 within an insulating sheath 128 (FIGS. 8 and 9).

The part of the sleeve 123 located above the plate 120a is surrounded by a serpent coil 129 disposed against the sleeve in the space between the latter and the case 120. It comprises a lower inlet 129a and an upper outlet 129b. It is possible to supply this coil as desired with a cooling or heating fluid so as to maintain a given temperature within the vibration zone. It is indeed necessary not to exceed a certain temperature in this zone owing to the fragility of the transducers which cannot withstand temperature higher than given values. In some cases, it could also be necessary to raise the temperature of the vibration zone so as to encourage the polymerization of the products to be treated. This temperature is controlled by means of a thermistor placed in a sheath 130 which extends within the vibration zone through the wall of the sleeve 123 and between the transducers. The thermistor is electrically connected by two conductors 131 and 132 to an electric control circuit, for example of the type shown in FIG. 12, which permits automatically controlling a device supplying fluid to the coil 129 in accordance with this temperature.

The vibration chamber $C_1$ is secured to the upper part of and is coaxial with the refining chamber $C_2$. This chamber $C_2$ is formed of two coaxial cylindrical elements, namely an inner element 135 and an outer element 136 composed for example of sheet steel and whose facing surfaces are covered with asbestos. These cylindrical elements are held in position by annular grooves 135a, 135b and 136a, 136b which are formed respectively in two circular end plates 137 and 138 in which the ends of the walls of the cylindrical elements are engaged with interposition of sealing elements (not shown). The end plate 137 is clamped against the annular plate 120a of the chamber $C_1$ with interposition of an annular sealing element 139 which renders the assembly fluidtight and is heat and vibration resistant. The plate 137 and the sealing element 139 are respectively provided with registering central apertures 140 and 141 having the same diameter, and the lower end of the sleeve 123 of the chamber $C_1$ extends through these apertures. The plate 120a is also provided with an eccentrically disposed aperture from which leads a gas-evacuating pipe 142. This aperture communicates with the chamber $C_2$ between the wall of the sleeve 123 and the walls of the apertures 141 and 140 of the sealing element 139 and plate 137 respectively. The pipe 142 is connected to the pipe 112 before the valve $R_4$ is reached. This connection has not been shown for reasons of clarity.

The lower end plate 138 of the chamber $C_2$ is clamped, with interposition of an annular heat- and vibration-resistant sealing element 143, against a plate 144 constituting the top of the cooling chamber $C_3$ of the column. The assembly is firmly held in position by a number of tie rods 145 which have screwthreaded ends and extend through aligned apertures formed in the plates 120a, 137, 138 and 144 and are locked in position by nuts 146, 147 screwed on these screwthreaded ends.

Disposed between the walls of the elements 135 and 136 and against the outer wall of the element 135 is an electric heating resistance 148 which maintains a given temperature in the refining zone located within the element 135. The terminals 148a and 148b of this heating resistance are connected by two conductors 149 and 150 to an electric control circuit which is of the type shown in FIG. 12 and includes a control thermistor disposed within a sheath 151 extending into the refining zone. This thermistor is connected by conductors 152 and 153 to the aforesaid control circuit.

The lower plate 138 of the chamber $C_2$ is provided with a large outlet aperture 154 registering with an aperture 155 of the same diameter and formed in the upper plate 144 of the chamber C, and with the central aperture of the annular sealing element 143. The cooling chamber $C_3$ comprises, in the same manner as the chamber $C_2$, two coaxial cylindrical elements 156 and 157 which are secured in two end plates 144 and 158 by grooves identical with those previously described in respect of the plates of the chamber $C_2$. Circulating between the two cylindrical elements is a cooling gas or, if desired, a cooling liquid which enters by way of a pipe 159 and is discharged by way of a pipe 160. Tie rods 161 maintain the elements of this chamber assembled and secure them to the chamber $C_2$ and to the rest of the plant. The plate 158 is provided with a large aperture 162 maintaining the chamber $C_3$ in communication with the outlet pipe 113 leading to the crusher or breaking-up device of the plant.

The automatic control devices controlling operation of the plant will now be described with reference to FIGS. 10 and 11.

Figure 10:
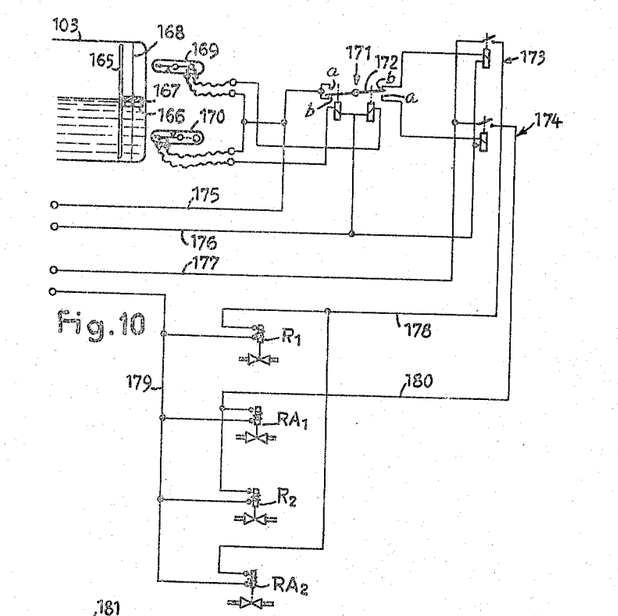
FIGS. 10, 11 and 12 are wiring diagrams of the electric control devices permitting operation of the plant in accordance with the second embodiment of the invention.

FIG. 10 shows the control device controlling the supply of the products to be polymerized to the various containers.

The regulation of the amount of product to be polymerized is effected in the container 103. A part of the liquid is maintained stationary by means of a deflector 165. A float 166 is located on the surface of the liquid and is provided with a permanent magnet 167. This assembly is guided by an axial guide 168 secured to the container. Near to the top and bottom of the container are two mercury tumbler switches 169 and 170 which are electrically connected in the known manner, as shown, to an electrically operated locked relay 171 comprising a movable contact blade 172 capable of assuming two positions a—a and b—b controlling, one, the operation of a relay 173 and, the other, the operation of a relay 174. A control voltage is supplied to the relays 172, 173 and 174 by conductors 175 and 176. The relays 173 and 174 are part of two control circuits of electrically operated valves, one of these circuits comprising a supply conductor 177 connected to a source of power (not shown), the relay 173, a conductor 178, the electrically operated valve $R_1$ and the electrically operated valve $RA_2$ which are connected in parallel, and a conductor 179 returning to the source of current, and the other circuit comprising the conductor 177, the relay 174, a conductor 180, the electrically operated valves $R_2$ and $RA_1$ connected in parallel, and the conductor 179.

This control device operates in the following manner:

The container 103 being empty, the float 166 is located at the bottom of the latter and has closed the circuit controlled by the switch 170. The control voltage (conductors 175, 176) brings the electrically controlled locked relay 171 to its position b—b in which it causes the closure of the circuit controlled by the relay 173.

This causes:

(a) The opening of the valve $R_1$ (that is, the supply of the mixture from the container 101 to the container 103).

(b) The opening of the valve $RA_2$ (that is, the supply of nitrogen to the container 107).

As liquid enters the container 103 the float 166 reaches the level of the contact 169 which brings, through the medium of this soft-iron contact 169, the electrically controlled locked relay 171 to its position a—a which results in the closure of the circuit controlled by the relay 174.

This causes:

(a) The closure of the valve $R_1$ (cutting off the supply of the mixture to the container 103).

(b) The closure of the valve $RA_2$ (cutting off the supply of nitrogen to the container 107).

(c) The opening of the valve $RA_1$ (supply of nitrogen to the container 103).

(d) The opening of the valve $R_2$ (the passage of the mixture from the container 103 to the container 107).

The electrically operated valves of the plant are all so designed as to be closed when they are not energized.

Figure 11:
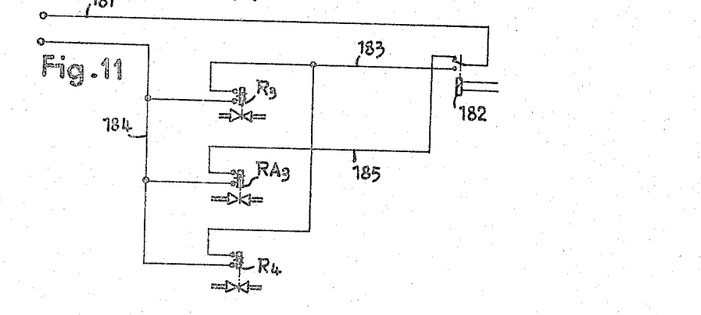

FIG. 11 shows the automatic control device controlling the supply to the reaction column C. This circuit is controlled by the high-frequency generator G supplying the transducers T of the vibration chamber $C_1$. It comprises a conductor 181 connected to a source of power (not shown), a relay 182 having two positions, then, after this relay, and two actuating circuits one of which passes through a conductor 183, the valves $R_3$ and $R_4$ connected in parallel and a conductor 184 returning to the source of current, whereas the other passes through a conductor 185, the valve $RA_3$ and the conductor 184.

The device shown in FIG. 11 operates in the following manner:

When the high-frequency generator is inoperative, the relay 182 is in the position in which, owing to the supply voltage, the valve $RA_3$ is open so as to eliminate the residual elements which are not totally polymerized, located in the sleeve 123, by means of a high pressure of nitrogen or neutral gas (circuit 185, $RA_3$, 184), the pressure gauge-break switch M permitting closing the valve $RA_3$ as soon as this operation has finished.

When the high-frequency generator operates, the relay 182 is in the position in which, owing to the supply voltage, the valves $R_3$ and $R_4$ are open (circuit 183, $R_3$, $R_4$, 184).

The result of this is to bring about respectively the supply of the mixture to the vibration chamber $C_1$ and the opening of the outlet for the hydrogen cyanide through the pipes 112 and 142 of the chambers $C_1$ and $C_2$.

In the case of an electrical break-down, all the valves of the plant return to their position of rest, namely their closed position. Safety batteries are all that is necessary for furnishing the supply voltage which permits the valve $RA_3$ to perform its function for some moments.

Figure 12:
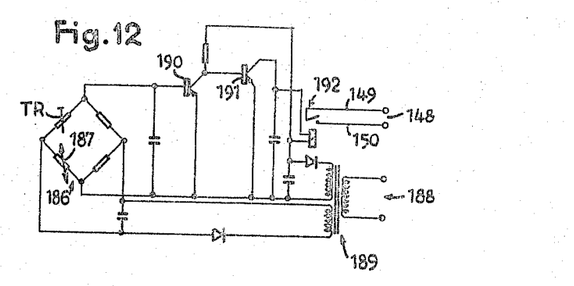

FIG. 12 shows a conventional control circuit for the heating resistance of the chamber $C_2$. This circuit can be employed for any apparatus controlled by a thermistor. It comprises, in accordance with a conventional wiring such as that shown, the thermistor $T_R$ connected in one branch of a Wheatstone bridge 186 another of whose branches carries an adjustable resistance 187. The bridge is supplied by an alternating-current source 188 (for example of 220 volts) through a transformer 189. The off-balance voltage due to the variation in the temperature in the chamber or the container in which the thermistor is placed is amplified by transistors 190, 191 (such as transistors of the types OC74 and OC28 for example) which control a relay 192 connected to the conductors 149 and 150 of the heating resistance.

A thermistor of the type $LC_2$ of $5K\Omega$ (0–100° C.) permits obtaining a regulation of the temperature to within 0.1° C. in the apparatus under consideration (such as the container 107 and the chambers $C_1$ and $C_2$ for example).

The process according to the invention will now be described with reference to the plant shown in FIGS. 7–12, assuming that the electric control devices of the valves and of the thermic devices operate normally.

The mixture of the monomers or products to be polymerized and other added elements (including a catalyst) enters the chamber $C_1$ through the pipe 109 after having been heated, if desired, to a given temperature in the container 107. The pipe 109 can, if desired, terminate in a diffuser which causes the liquid to be polymerized to flow in thin streams within the sleeve 123. In the latter, the product is subjected to ultrasonic vibrations generated by the transducers T, their frequency varying preferably between 500 kilocycles and 6 megacycles per second, depending on the product to be polymerized.

It has been possible to determine the required ultrasonic frequency in the following manner:

Taking the following particular case, namely that of the rupture of the olefinic double bonds of styrene and acrylonitrile by the use of ultrasounds.

It is, for example, desired to break one of the bonds of the double bond of the lateral chain of the styrene and one of the bonds of the double bond of the acrylonitrile so as to result in a substantially total polymerization by the supply of energy through ultrasounds.

It should be recalled that the double bond indicated above resides in the fact that two peripheral electrons of two neighboring carbon atoms gravitate around two nuclei.

Infrared-ray spectroscopy indicates that the resonance frequency is such that it is the radiations of $\lambda=6.13$ microns which are absorbed by the double bond of the styrene and the radiations of $\lambda=6.08$ microns which are absorbed by those of the acrylonitrile.

In taking the mean value of 6.10 microns (which is close enough to the desired values for the resonance phenomenon to be sufficiently maintained), it is possible to calculate that the corresponding frequency is:

$$F=c/\lambda=4.92 \ 10^{13} \text{ c.p.s.}$$

This frequency is very high.

There is therefore employed a subharmonic fraction $\frac{1}{2} n$ of this frequency.

If $n=24$:

$$F=2.933 \ 10^6 \text{ c.p.s.}$$

This ultrasonic frequency can be obtained by the electronic method according to the invention.

The necessary power can also be determined. The polymerization heat of the two monomers is of the order of 18.3 kilo-calories per mole since the reaction is exothermic. However, this reaction can occur only if an energy barrier is overcome, which requires a 50% additional supply of energy. Consequently, it is necessary to supply a starting energy of 30 kilo-calories per mole.

It is important not to exceed this value over much, since otherwise the double bonds would be completely broken, that is to say, the monomer would be destroyed.

For example, if the amount of monomers to be polymerized is 500 g. per minute, it is 0.1 mole which reacts in each second and this requires $1.25 \ 10^4$ joules.

The generator must therefore have a power of 12.5 kilowatts. Bearing in mind the loss of ultrasonic energy in the product to be polymerized, a theoretical power of 50 kilowatts was previously necessary. In the present case, the loss of ultrasonic energy is negligible and the theoretical power of 12.5 kilowatts does not need to be increased. This theoretical power is high and would render the process very costly if the presence of catalysts did not reduce it in extremely large proportions.

The reaction is carried out at variable temperatures depending on the products to be polymerized and it could be necessary in some cases to cool or heat the vibration zone by means of the coil 129. The resistance to heat of the piezoelectric ceramics employed must also be borne in mind. The temperature within the vibration zone is as a rule lower than about 120° C. but this value is not critical. During this operation, the gases produced by the reaction, such as hydrogen cyanide for example, are evacuated by way of the pipe 112 whose valve $R_4$ is open.

The polymerized product obtained, which is still in the fluid state, leaves the vibration chamber $C_1$ and enters the refining chamber $C_2$ in which it is held by the heating resistance 148 at such temperature as to permit the evacuation of almost all the remaining occluded gases which leave this chamber by way of the pipe 114 which leads to the pipe 112 of the chamber $C_1$. The temperature in the refining chamber is usually between 40 and 70° C. but this temperature is merely illustrative and can vary in accordance with the product to be treated.

The refined polymerized product then enters the cooling chamber $C_3$ and the other apparatus of the plant.

The electric control devices insure a regular operation of the plant and the stoppage of the latter when any incident, such as a current break-down for example, occurs.

It is possible to clean out the plant with a neutral gas by means of the valve $RA_3$.

It is possible to employ as transducers for the vibration chamber stacked cylindrical piezoelectric ceramic bodies whose central passageway forms the vibration zone. Similarly, the sleeve 123 could also have a rectangular profile or a polygonal cross-sectional shape having more than four sides and the high-frequency generator could be of any appropriate type for supplying the required vibration frequencies through the transducers.

The process and plant according to the invention have considerable advantages over processes and plants of known type in that they permit:

(a) Uniting in a single plant of very small overall size all the apparatus required for obtaining the plastic material in a continuous manner, this material being ready for use as it issues from the plant.

(b) Obtaining a substantially total polymerization of the constituents of the plastic material, which it had not been possible to obtain up to the present time.

(c) Obtaining a production of several tons per day in a continuous manner in a plant which is very small compared to plants of known type.

From the foregoing description it will be apparent that I have disclosed a process for the preparation of solid polymers which involves the free fall of the monomeric constituents of such polymers, specifically constituents with an olefinic double bond such as the styrene and the acrylonitrile referred to above, through a column of inert gas such as nitrogen in which supersonic vibrations are excited, as more fully described in connection with chamber 25 of FIG. 3; these vibrations are thereby communicated to the freely falling constituents so as to promote their polymerization and solidification during their descent.

Although specific embodiments of the invention have been described, many modifications and changes may be made therein without departing from the scope of the invention as defined in the appended claims.

Having now described my invention, I claim as new and desire to secure by Letters Patent:

1. A process for preparing solid polymers, comprising the steps of:
    (a) exciting supersonic vibrations at a frequency between 500 kilocycles and 6 megacycles per second in a column of inert gas;
    (b) allowing monomeric constituents with an olefinic double bond to fall freely through the vibrating column in a continuous flow;
    (c) continuing the descent of said flow to a state of solidification; and
    (d) recovering the resulting solids.

2. A process as defined in claim 1 wherein said monomeric constituents are styrene and acrylonitrile.

3. A process as defined in claim 1 wherein said supersonic vibrations are at a frequency which is a subharmonic of a frequency in the vicinity of a resonant frequency of said monomeric constituents.

4. A process as defined in claim 1 wherein said flow is divided into a multiplicity of streams on passing through said column.

References Cited

UNITED STATES PATENTS

| | | | |
|---|---|---|---|
| 2,738,172 | 3/1956 | Spiess et al. | 259—1 |
| 2,800,444 | 7/1957 | Huges et al. | 204—154.1 |
| 3,008,886 | 11/1961 | Sarantities | 204—159.24 |
| 3,128,240 | 4/1964 | Kusy | 204—154.1 |
| 3,165,299 | 1/1965 | Balamuth et al. | 259—1 |
| 3,196,096 | 7/1965 | Toulmin | 204—159.22 |

OTHER REFERENCES

Henglein: "Die Auslosung und de Verlauf der Polymerisation," Die Mackromolekure Chemi Band XIV heft 1, pp. 15–17, 1954, QD 281 P6M2.

Perry et al.: Chemical Engineering Handbook, 3rd ed., 1950, New York, p. 159, paragraph beginning Resins, Gums, Waxes, Molding Powders.

SAMUEL H. BLECH, *Primary Examiner.*

MURRAY TILLMAN, *Examiner.*

N. F. OBLON, R. B. TURNER, *Assistant Examiners.*